United States Patent [19]
Tullos

[11] 3,781,908
[45] Dec. 25, 1973

[54] ADJUSTABLE CHUCK ASSEMBLY FOR CAPILLARY PEN SYSTEM

[76] Inventor: Aubrey R. Tullos, 1510 Haywood St., Odessa, Tex. 79760

[22] Filed: May 15, 1972

[21] Appl. No.: 253,009

[52] U.S. Cl................. 346/140, 248/74 R, 287/116
[51] Int. Cl. ............................................. G01d 15/16
[58] Field of Search............... 346/139 C, 140, 146; 287/116; 248/74 R, 56

[56] References Cited
UNITED STATES PATENTS

| | | | |
|---|---|---|---|
| 1,835,155 | 12/1931 | Harbert................................. | 248/56 |
| 1,927,089 | 9/1933 | Golden ............................ | 248/56 X |
| 2,775,502 | 12/1956 | Sykora........................... | 346/140 X |
| 2,800,385 | 7/1957 | Cannon............................... | 346/140 |
| 3,285,551 | 11/1966 | Tschanz............................... | 248/56 |
| 3,514,783 | 5/1970 | Erdman ............................. | 346/140 |
| 3,644,933 | 2/1972 | Tullos et al........................ | 346/140 |

Primary Examiner—Joseph W. Hartary
Attorney—William A. Strauch et al.

[57] ABSTRACT

The disclosure includes an incrementally adjustable chuck assembly mount for an inking pen on the end of a recorder arm of a recorder apparatus. The mounting provides an infinite number of possible settings for the pen while permitting easy replacement with another pen.

7 Claims, 6 Drawing Figures

PATENTED DEC 25 1973      3,781,908

ADJUSTABLE CHUCK ASSEMBLY FOR CAPILLARY PEN SYSTEM

CROSS REFERENCE TO RELATED PATENTS

Capillary pen systems in and with which the present invention may be used are disclosed in U.S. Pat. No. 3,644,933, issued Feb. 22, 1972, for Reservoir Type Inking Pen System, and U.S. Patent Application Ser. No. 222,047, filed Jan. 31, 1972 for Inking Pen Constructions.

BACKGROUND OF THE INVENTION

The invention was developed for use with capillary ink feed systems found in a wide variety of recorder apparatuses which employ such a system to draw extremely fine, uniform width, unbroken lines on stationary or driven charts such as timed movement drum or circular recording charts. Ordinarily, the complete system and inking pen comprises a plastic vial or other suitable ink supply, a capillary pen tube with a writing point at its end, and a length of small diameter, extremely flexible tubing interconnecting the pen tube and the ink supply. These components of the system are more fully described and explained in the above-mentioned related U.S. Patent and copending application.

The present invention is concerned with mounting of the pen tube on the sweep recorder arm of the recorder apparatus so that the pen tube and its associated writing point may be adjusted lengthwise, with respect to the long axis of the sweep recorder arm, or rotationally, about the long axis of the pen tube, to any one of an infinite number of desired positions, for proper calibration of the recorder apparatus and its chart, as well as appropriate disposition of the pen tube writing point to the chart of the recorder apparatus so that the writing tip is positioned most effectively to smoothly draw an even, unbroken line on the chart.

Prior art devices even remotely similar to the present invention have been surprisingly few in number. U. S. Pat. No. 1,895,727 discloses a capillary pen connected to the sweep arm of a recorder apparatus by means of a hooked end on the pen engaging one of a series of spaced anchor holes in the recorder arm. Thus, one can make only a few (two or three) positions of longitudinal pen adjustment, and no provision is made for rotational disposition of the pen about the long axis of the recorder arm. On the other hand, the pen tube in U. S. Pat. No. 3,482,256 is rotatably positionable, but cannot be adjusted longitudinally, and it cannot be firmly clamped to the recorder arm. U. S. Pat. No. 1,648,227 discloses a rotatable mount for the writing pen about an axis opposed 90° to the long axis of the recorder arm, only two settings are disclosed, and no other positioning means are disclosed. U. S. Pat. Nos. 841,222 and 1,347,787 disclose spring clip mounts for capillary pens as well as their ink supplies while U. S. Pat. No. 1,122,053 discloses a circular frictional collar mount for a capillary pen and its ink supply. However, selective positioning of the pen with respect to its recorder arm is not disclosed in these last mentioned three patents.

In contradistinction to these enumerated prior patents, the present invention provides a mounting for a capillary pen on the sweep recorder arm of a recorder apparatus which provides multiple plane positioning for the pen while permitting easy replacement of the pen.

SUMMARY OF THE INVENTION

A primary object of the invention resides in the provision of a mounting assembly for the capillary pen tube of a recorder apparatus on the sweep recorder arm of that apparatus which provides a infinite number of mounting dispositions for the pen with respect to its recorder arm.

Another object of the invention is to provide a capillary pen tube mount on the sweep recorder arm of a recorder permitting easy replacement of the pen tube.

It is a further object of the invention to provide a capillary pen tube mount made of a minimal number of inexpensive parts which provides an infinite number of selective dispositions of the pen tube with respect to the sweep recorder arm upon which it is mounted, and with respect to the chart being drawn by the writing point of the pen tube.

Yet another object of the invention is to provide a capillary pen tube mount on the sweep recorder arm of a recorder apparatus for adjusting the pen tube lengthwise, along the axis of the recorder arm, and rotationally, about the long axis of the pen tube.

Still another object of the invention is to provide a capillary pen tube mount on the sweep recorder arm of a recorder apparatus having mated threaded parts, externally knurled for easy grasping.

Further novel features and other objects of this invention will become apparent from the following detailed description, discussion and the appended claims taken in conjunction with the accompanying drawings.

BRIEF DESCRIPTION OF DRAWINGS

A preferred structural embodiment of this invention is disclosed in the accompanying drawings in which.

DESCRIPTION OF THE PREFERRED EMBODIMENTS

Figure 1:
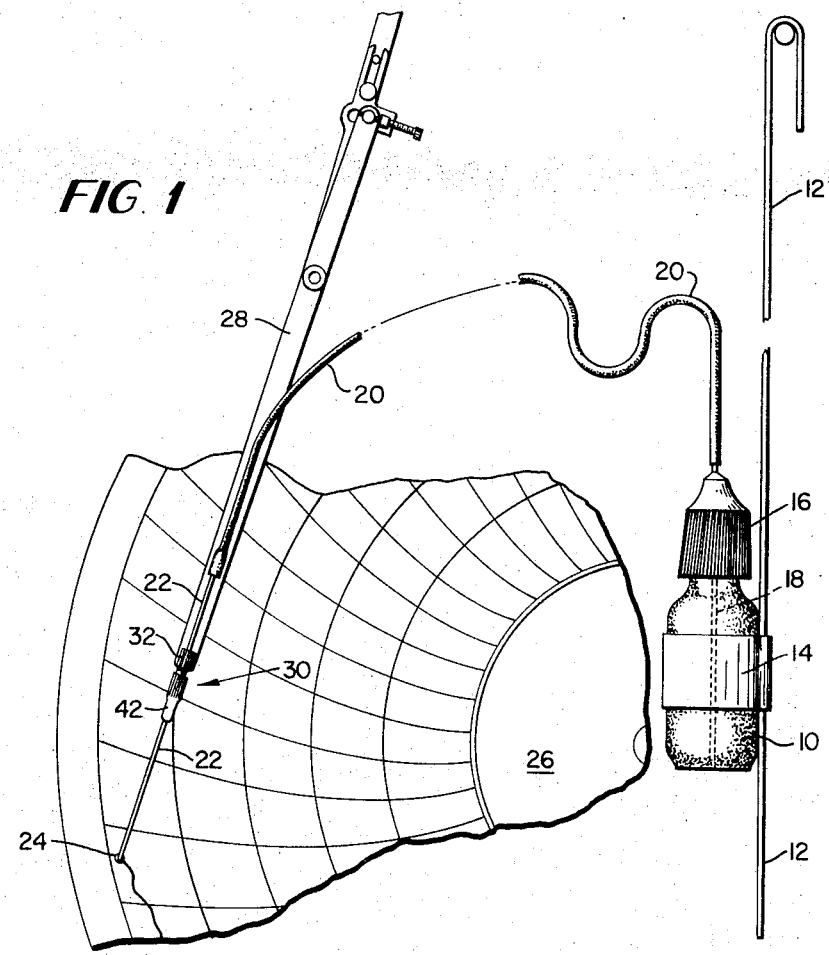
FIG. 1 is a partial diagrammatic view illustrating a capillary ink pen system of a recorder apparatus and the invention.

A typical capillary ink pen system includes a supply of ink contained in a bottle 10 which is vertically selectively positionable to assure proper ink flow along the length of a wire mounting hanger 12 by a resilient spring clip 14 urging bottle 10 against its hanger 12. A stopper 16 has a vertically oriented stinger 18 inserted therethrough which has a length of extremely fine diameter flexible capillary tubing 20 serving as a conduit for ink from stinger 18 to the end of a pen tube 22 having a writing point 24. Normally, a 90° bend is formed in pen tube 22, as at 23, to properly orient the writing point 24 over the recording writing surface, such as circular chart 26, which is driven by apparatus (not shown) having a timed drive to produce a timed recording in conjunction with sweep movement arm 28, which movement is induced by some condition being recorded.

Preferably, both stinger 18 and pen tube 22 are made of capillary dimension stainless steel tubing, while flexible conduit 20 is made of capillary dimension plastic tubing. In a specific embodiment, the steel tubing used has an O. D. of about 0.0344 inch with an I. D. of 0.023 inch. The plastic tubing has dimensions on the order of 0.059 inch O. D. and 0.028 inch I. D., and may be made of "Tygon" plastic. In both cases, dimensions are not critical.

Figure 5:
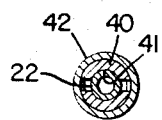
FIG. 5 is a sectional view taken along lines 5—5 of FIG. 4.

An adjustable chuck mount 30 secures pen tube 22 to recorder arm 28 and includes a cylindrical chuck 32, having one knurled end 34 as shown secured to the end of recorder arm 28 by silver solder 36 or other suitable means, and having its other end externally taper threaded at 38 and split to provide several segmental spring finger portions 40, two such finger portions, semi-cylindrical in cross section, being illustrated. The fingers have a spring effect biasing them outwardly and are grooved coaxially at 41 along their inner surfaces to enable close embracing of the pen tube 22. An internally taper threaded clamping cap 42, having an aperture 44 to receive pen tube 22 therethrough, and a knurled portion 46 for easy grasping, is screwed over the finger threads 38 and compresses fingers 40 toward each other as it is turned onto the fingers. Thus the fingers are forced inwardly against the portion of pen tube 22, which passes through the chuck mount, to securely lock the pen tube 22 onto recorder arm 28. As shown in FIG. 5, each finger 40 is internally semi-circular or curved at 41 to conform to the outer surface of pen tube 22 to provide maximum contact areas of frictional engagement between fingers 40 and pen tube 22 without damaging pen tube 22 by deformation during such engagement.

Figure 2:
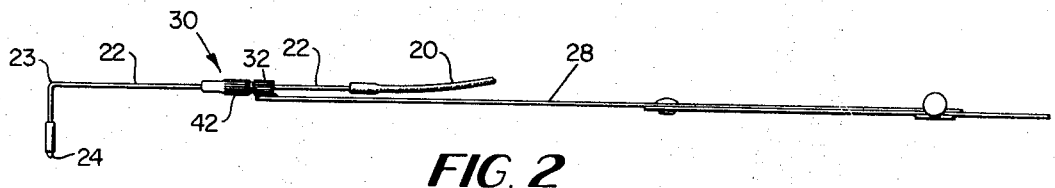
FIG. 2 is a side elevational view of the invention shown in FIG. 1.
Figure 3:
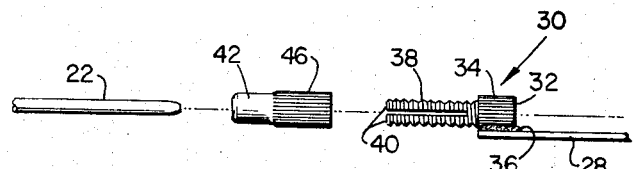
FIG. 3 is a side elevational exploded view of the invention shown in FIG. 2, drawn to an enlarged scale.
Figure 4:
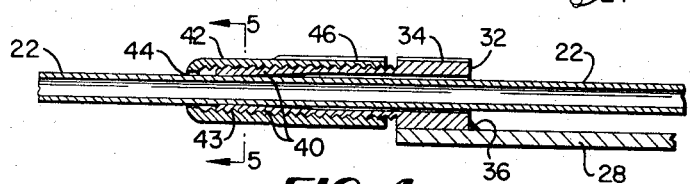
FIG. 4 is a sectional view through the invention as shown in FIG. 2, drawn to an enlarged scale.

It is quite obvious from an inspection of the Figures that pen tube 22 may be adjusted lengthwise, with respect to its own or the long axis of recorder arm 28, to any one of an infinite number of dispositions over chart 26 so as to properly calibrate the recorder apparatus (not shown) and its chart 26. Additionally, pen tube 22 may be rotated within chuck 30 so that writing point 24 may be properly disposed against chart 26; in this case, the desired disposition is 90° as shown in FIG. 1. Finally, the pen tube 22 with its writing point 24 may be replaced by a fresh pen tube and point merely by slipping flexible capillary tubing 20 off of pen tube 22, and unthreading cap 42 until wings 40, 40 expand sufficiently to allow withdrawal of pen tube 22 from adjustable chuck 30. A new or fresh pen tube 22 may then be inserted in chuck 30, from the left hand side with respect to FIGS. 2, 3 and 4, and cap 42 rethreaded until wings 40, 40 are in frictional clamping engagement with the main body of pen tube 22. Knurled surfaces 42 and 46 are provided for convenience in gripping when manually loosening and tightening the chuck assembly. In lieu thereof, a studded hexagonal, or flattened surface, etc. which can be easily manually grasped, may be provided.

Figure 6:
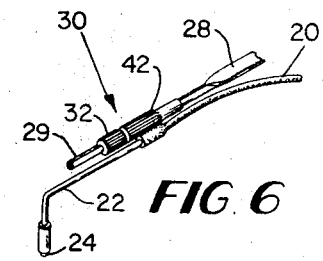
FIG. 6 is a partial perspective view showing another embodiment of the invention.

In the embodiment shown in FIG. 6, the adjustable chuck is attached to pen tube 22 rather than to recorder arm 28. The recorder arm 28 includes a cylindrical extension 29 which is inserted into the chuck 30. Thus pen tube 22 and chuck 30 are adjustably positioned along the length of extension 29.

The invention may be embodied in other specific forms without department from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In a capillary inking pen system for use with recorder apparatus, the pen system including an ink supply, ink conduit means from the ink supply, a recorder apparatus sweep recorder arm and a pen tube having a writing point and being in fluid communication with the ink supply: incrementally adjustable mounting means on one of the recorder arm or pen tube for securing said pen tube to the recorder arm in preselected orientation of one to the other, rotationally and axially with respect to the long axis of the pen tube, comprising at least two cooperating clamping means for securing the pen tube to the recorder arm, a first one of said cooperating means having plural segments thereon arranged to at least partially surround said one of the recorder arm or pen tube, a second of said cooperating means including segment engaging means cooperating with said segments to urge them into frictional engagement with said one of the recorder arm or pen tube for axially and non-rotatably retaining said one of the recorder arm or pen tube in said mounting means, said one of the recorder arm or pen tube being freely axially movable and rotatable within said first one of said cooperating means prior to actuation of said segment engaging means.

2. The capillary inking pen system as recited in claim 1 wherein said mounting means further comprise silver solder means for bonding one of said cooperating means to said recorder arm.

3. The capillary inking pen system as recited in claim 1 wherein said first one of said cooperating means further comprises a cylindrical chuck secured to said recorder arm, said plural segments being formed integrally with and extending from said cylindrical chuck, and arranged to frictionally clampingly engage said pen tube.

4. The capillary inking pen system as recited in claim 3 wherein each of said plural segments have a curved inner surface generally conformed to the outer surface of said pen tube for maximum surface area contact between each segment and said pen tube when said mounting means are in frictional clamping engagement with said pen tube.

5. The capillary inking pen system as recited in claim 3 wherein said second of said cooperating means comprises an internally cylindrical clamping cap arranged to fit over and urge said plural segments into frictional clamping engagement with said pen tube.

6. The capillary inking pen system as recited in claim 5 wherein said cap is internally threaded and said segements are matingly externally threaded to receive said clamping cap in threaded engagement therewith.

7. The capillary inking pen system as recited in claim 5 wherein said cap is externally knurled.

* * * * *